US010287506B2

United States Patent
Lin et al.

(10) Patent No.: US 10,287,506 B2
(45) Date of Patent: *May 14, 2019

(54) BIOMASS LIQUEFACTION PROCESS, AND FUEL OILS AND CHEMICAL MATERIALS PREPARED BY THE SAME

(71) Applicant: Beijing Huashi United Energy Technology and Development Co., Ltd, Beijing (CN)

(72) Inventors: Ke Lin, Beijing (CN); Lin Li, Beijing (CN); Lixin Guo, Beijing (CN); Yongjun Cui, Beijing (CN); Lilong Jiang, Beijing (CN)

(73) Assignee: BEIJING HUASHI UNITED ENERGY TECHNOLOGY AND DEVELOPMENT CO., LTD, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,383

(22) Filed: Nov. 20, 2017

(65) Prior Publication Data

US 2018/0142163 A1     May 24, 2018

(30) Foreign Application Priority Data

Nov. 21, 2016 (CN) .......................... 2016 1 1039494
Nov. 21, 2016 (CN) .......................... 2016 1 1043926
Nov. 21, 2016 (CN) .......................... 2016 1 1045877

(51) Int. Cl.
    *C10G 1/06* (2006.01)
(52) U.S. Cl.
    CPC ..... *C10G 1/065* (2013.01); *C10G 2300/1014* (2013.01); *C10G 2300/44* (2013.01); *Y02P 30/20* (2015.11)
(58) Field of Classification Search
    None
    See application file for complete search history.

(56) References Cited

U.S. PATENT DOCUMENTS

| 2009/0326285 | A1 | 12/2009 | Bauer et al. |
| 2011/0167713 | A1 | 7/2011 | Quignard et al. |
| 2011/0277378 | A1* | 11/2011 | Von Hebel .............. C08H 8/00 |
| | | | 44/436 |
| 2013/0146508 | A1* | 6/2013 | Quignard .............. C10G 1/006 |
| | | | 208/413 |
| 2018/0142161 | A1 | 5/2018 | Lin |
| 2018/0142162 | A1 | 5/2018 | Lin |

FOREIGN PATENT DOCUMENTS

| CN | 1307926 | 8/2001 |
| CN | 201351763 | 11/2009 |
| CN | 102127462 | 7/2011 |
| CN | 102310005 | 11/2012 |
| CN | 103242871 | 8/2013 |
| CN | 104096563 A * | 10/2014 |
| CN | 204051658 | 12/2014 |
| CN | 104388117 | 4/2015 |
| CN | 104588079 | 6/2015 |
| CN | 204752627 | 11/2015 |
| WO | 2009146225 | 12/2009 |
| WO | 2012140333 | 10/2012 |
| WO | WO-2015145279 A1 * | 10/2015 ................ C10L 1/02 |

OTHER PUBLICATIONS

CN104096563A Machine Translation obtained from EPO (Year: 2018).*
G.M. Ovchinnikova "Substantive Examination Request issued in co-pending RU app. No. 2017140242/04(069901)" Russian Industrial Property Institute (RIPI); pp. 1-4 Oct. 10, 2018.

* cited by examiner

*Primary Examiner* — Philip Y Louie
(74) *Attorney, Agent, or Firm* — Nicholas J. Landau; Bradley Arant Boult Cummings LLP

(57) ABSTRACT

The present invention relates to the field of biological energy, in particular to a biomass liquefaction process and fuel oil and chemical raw materials prepared by the same. The biomass liquefaction process comprises the following steps: preparing a slurry comprising a first catalyst and a biomass; performing a first hydrogenation reaction by introducing hydrogen to the slurry to obtain a first stage hydrogenation product; performing a second hydrogenation reaction by adding a second catalyst and introducing hydrogen into the first stage hydrogenation product to obtain a second stage hydrogenation product; and subjecting the second stage hydrogenation product to separation operation to obtain a fuel oil and chemical raw material; wherein the first hydrogenation reaction is controlled to have a reaction pressure of 13-25 MPa and a reaction temperature of 200-350° C., and the second hydrogenation reaction is controlled to have a reaction pressure of 13-25 MPa and a reaction temperature of 380-480° C. The present invention provides a biomass liquefaction process with high reaction efficiency and high liquid yield without coke generation.

25 Claims, No Drawings

BIOMASS LIQUEFACTION PROCESS, AND FUEL OILS AND CHEMICAL MATERIALS PREPARED BY THE SAME

CROSS REFERENCE TO RELATED APPLICATIONS

This application cites the priority of Chinese Patent Application No. 201611045877.8 filed on 21 Nov. 2016 (pending); Chinese Patent Application No. 201611039494.X filed on 21 Nov. 2016 (pending); and Chinese Patent Application No. 201611043926.4 filed on 21 Nov. 2016 (pending). The contents of all of the foregoing applications are incorporated by references in their entireties, although the prosecution histories of the foregoing applications are not incorporated by reference.

TECHNICAL FIELD

The present invention relates to the field of biological energy, in particular to a biomass liquefaction process, and fuel oil and chemical raw materials prepared by the same.

BACKGROUND

Biomass means all organic matters which are formed by directly or indirectly using the photosynthesis of green plants, including plants, animals, microbes and excretions and metabolites thereof, and has renewability, low pollution and widespread distribution. In view of energy safety and environment protection, the development and utilization of the biomass have therefore become a strategic key for developing renewable energy sources at present.

The biomass liquefaction technology is an important part of biomass resource utilization and are mainly divided into two classes, i.e., indirect liquefaction and direct liquefaction, wherein the direct liquefaction means directly liquefying the biomass from a solid to a liquid by methods such as hydrolysis and supercritical liquefaction or by introducing hydrogen, inert gas, etc. under the action of a solvent or a catalyst at proper temperature and pressure. The direct biomass liquefaction technologies include pyrolytic liquefaction, catalytic liquefaction, pressurized hydroliquefaction, etc., among which the pressurized hydroliquefaction has high product yield and good product quality, however, the pressurized hydroliquefaction requires harsh reaction conditions and comprises very complicated procedures such as solid material drying, crushing, slurrying, heating, pressurizing, reacting and separation. For example, a process for co-liquefying heavy oil-biomass through hydrogenation is disclosed in a Chinese Patent Document CN103242871A. The process comprises the steps of pre-crushing a dried biomass to obtain a pre-crushed biomass of 40-100 meshes, then, mixing the pre-crushed biomass with a heavy oil to form a slurry, adding a catalyst and a vulcanizing agent into the slurry, then, putting the slurry into a slurry-bed hydrogenation reactor for carrying out hydrothermal cracking reaction by controlling a reaction temperature of 370° C. to 430° C. and a partial pressure of hydrogen to 4 MPa to 8 MPa to obtain a product mixture which was then subjected to fractionation to obtain a fuel oil, chemical raw material and coke.

Although the above process can achieve a conversion rate of the biomass as high as 90 wt % or more and an oil phase yield of about 70 wt %, this technology has a relatively high reaction temperature and a smaller hydrogen partial pressure, and only one liquefaction reaction is carried out, so as to cause a lower reaction efficiency of hydrolysis, cracking, hydrogenation and so on in the liquefaction process, and further result in generation of a large amount of coke and thereby a low liquid yield. Therefore, how to improve the existing biomass liquefaction process to overcome the defects of low reaction efficiency and generation of large amount of coke is a difficult technical problem that needs to be solved by those skilled in the art.

SUMMARY

Therefore, the aim of the present invention is to provide a biomass liquefaction process which has a high reaction efficiency and a high liquid yield without coke generation. The present invention can overcome the defects in the existing biomass liquefaction process, including reaction insufficiency of hydrolysis, cracking, hydrogenation and the like and serious coke condensation polymerization.

In order to solve the technical problem described above, a technical solution adopted by the present invention is as follows.

In one aspect, the present invention provides a biomass liquefaction process, comprising the following steps of
S1: preparing a slurry comprising a first catalyst and a biomass;
S2: performing a first hydrogenation reaction by introducing hydrogen to the slurry and controlling a reaction pressure of 13-25 MPa and a reaction temperature of 200° C. to 480° C. to obtain a first stage hydrogenation product.

Preferably, the biomass accounts for 10-50 wt % of the slurry, preferably 30-40 wt % of the slurry.

Preferably, the first catalyst accounts for 0.1-10 wt % of the slurry, preferably 2 wt % of the slurry, and the first catalyst has a particle diameter of 5 μm to 500 μm.

Preferably, the slurry is prepared by
adding the first catalyst into a liquid biomass selected from a group consisting of vegetable oil, animal oil, gutter oil, animal feces and any mixture thereof; or
mixing a dried, crushed and dedusted solid biomass with the first catalyst to form a mixture, and adding the mixture into an oil product selected from a group consisting of vegetable oil, animal oil, coal tar, petroleum, a fuel oil and chemical raw materials prepared by the present process and any mixture thereof.

Preferably, the dried solid biomass has a moisture content of 3-25 wt %, preferably 5-15 wt %; and the crushed solid biomass has a particle size of 1-5000 μm, preferably 20-500 μm.

Preferably, introducing the hydrogen comprises:
introducing a high-pressure hydrogen into the slurry to prepare a reaction raw material mixture, wherein the high-pressure hydrogen and the slurry have a volume ratio of (600-1000):1; and
feeding the reaction raw material mixture into a first slurry bed reactor for undergoing hydrolysis, cracking and hydrogenation reactions, and simultaneous introducing a high-pressure cold hydrogen into the first slurry bed reactor by controlling the first slurry bed reactor to have a total gas velocity of 0.02-0.2 m/s, preferably 0.05-0.08 m/s;
wherein each of the high-pressure hydrogen and the high-pressure cold hydrogen has a pressure of 13-27 MPa, and the high-pressure cold hydrogen has a temperature of 50-135° C.

Preferably, introducing the high pressure hydrogen into the slurry comprises two steps of:

firstly, introducing a high-pressure and medium-temperature hydrogen into the slurry and heating the slurry up to 200-350° C. by heat transfer, and secondly, introducing a high-pressure and high-temperature hydrogen into the slurry;

wherein the high-pressure and medium-temperature hydrogen has a temperature of 180-350° C., and the high-pressure and high-temperature hydrogen has a temperature of 360-510° C.

Preferably, the cold hydrogen is introduced via 3-5 inlets formed on a side wall of the first slurry bed reactor.

Preferably, the first catalyst stored in the slurry bed reactor is controlled in an amount of 5-30 wt % of the mass of liquid phase in the first slurry bed reactor.

Preferably, the first hydrogenation reaction lasts for a period of 15-90 min.

Preferably, the first catalyst is a sulfidation treated biomass charcoal loaded with a first active component selected from a group consisting of iron oxide, iron oxide hydroxide, iron hydroxide, and any mixture thereof; or the first catalyst is a sulfidation treated amorphous iron oxide hydroxide.

Preferably, the biomass liquefaction process further comprises the following steps:

S3: performing a second hydrogenation reaction by adding a second catalyst and introducing hydrogen into the first stage hydrogenation product and controlling a reaction pressure of 13-25 MPa and a reaction temperature of 380-480° C. to obtain a second stage hydrogenation product; and S4: subjecting the second stage hydrogenation product to separation operation to obtain a fuel oil and chemical raw material.

Preferably, the second catalyst is added in an amount of 0.5-2 wt % of the first stage hydrogenation product, and the second catalyst has a particle size of 5 μm to 500 μm; and the second catalyst is prepared into an oil-catalyst slurry by mixing the second catalyst with a solvent oil in a mass ratio of (1-2):10 in prior to adding the second catalyst into the first stage hydrogenation product, wherein the solvent oil is selected from a group consisting of vegetable oil, animal oil, a bio-oil prepared by the present process and any combination thereof.

Preferably, introducing the hydrogen in step S3 is carried out by heating a mixture of the second catalyst and the first stage hydrogenation product to 380-480° C., preferably 430° C., and feeding the mixture into a second slurry bed reactor and introducing a high-temperature and high-pressure hydrogen for performing a second hydrogenation reaction, and simultaneous introducing a high-pressure cold hydrogen into the second slurry bed reactor, with controlling a total gas velocity at 0.06-0.1 m/s and a volume ratio of the hydrogen to the first stage hydrogenation product at (1000-1500):1 in the second slurry bed reactor;

wherein each of the high-temperature and high-pressure hydrogen and the high-pressure cold hydrogen has a pressure of 13-27 MPa, and the high-temperature and high-pressure hydrogen has a temperature of 430-480° C., and the high-pressure cold hydrogen has a temperature range of 50–135° C.

Preferably, the cold hydrogen is introduced via 3-5 inlets formed on a side wall of the second slurry bed reactor.

Preferably, the second catalyst stored in the second slurry bed reactor is controlled in an amount of 5-30 wt % of liquid phase in the second slurry bed reactor.

Preferably, the second hydrogenation reaction lasts for a period of 30-60 min.

Preferably, the biomass liquefaction process further comprises hydroforming the second stage hydrogenation product under a pressure of 7-23 MPa and a temperature of 250-460° C.

Preferably, the first catalyst is a sulfidation treated biomass charcoal loaded with a first active component selected from a group consisting of iron oxide, iron oxide hydroxide, iron hydroxide and any mixture thereof, and the second catalyst is a sulfidation treated biomass charcoal loaded with a second active component selected from a group consisting of oxides of Mo, W, Fe, Co, Ni or Pd or any mixture thereof; or the first catalyst is a sulfidation treated amorphous iron oxide hydroxide and the second catalyst is a sulfidation treated amorphous aluminium oxide loaded with a third active component selected from a group consisting of oxides of metals of group VIB, group VIIB and group VIII in the periodic table of elements and any mixture thereof.

Preferably, the vulcanizing agent and the first catalyst have a mass ratio of (0.4-1):1, and the vulcanizing agent and the second catalyst have a mass ratio of (0.01-1):1.

The technical solution of this invention has the following beneficial effects.

1. The biomass liquefaction process comprises firstly preparing a slurry comprising a first catalyst and a biomass; and then performing a first hydrogenation reaction by introducing hydrogen to the slurry and controlling a reaction pressure of 13-25 MPa and a reaction temperature of 200-350° C. to obtain a first stage hydrogenation product. In the biomass liquefaction process, the biomass is subjected to high-pressure high-temperature hydrolysis in the presence of a proper amount of water, and the hydrolysis products are subjected to cracking and hydrogenation under the action of hydrogen and catalyst, so that the conversion from biomass to fuel oil and chemical raw materials is realized. In the process disclosed by the invention, the conversion rate of the biomass reaches up to 100%, the yield of the fuel oil and the chemical raw materials is about 75%, and the generated coke amount is less than 0.1%.

2. In the biomass liquefaction process, if the biomass raw material is a solid, it is necessary to pre-process the solid biomass, including drying, crushing and dedusting the solid biomass and then mixing the dried, crushed and dedusted solid biomass with the first catalyst in order to better utilize the surface energy of the biomass powder for attaching the first catalyst to the surface of the solid biomass powder, so that the first catalyst can timely provide hydrogen transfer for the hydrolysis products of biomass, so as to ensure that there is no coke condensation polymerization generated in the whole process, and coke amount is reduced.

3. The biomass liquefaction process uses a slurry bed reactor, and the reaction raw materials are fed into the slurry bed reactor from its bottom for reaction, meanwhile, cold hydrogen is injected into the reactor. In this way, it can realize differential control of the flow velocity of each phase owing to different specific gravity of gas, liquid and solid materials in the reactor in combination with specific gravity difference change caused by the yield of light oil after the reaction, so that the biomass raw materials are subjected to hydrolysis, cracking and hydrogenation reaction from bottom to top in the reactor, and during the process, even if the biomass of high specific gravity and the catalyst solid particles of high specific gravity rise along with the gas and light oil, they would return to the bottom to participate in the reaction again under the action of the cold hydrogen at upper part. Therefore, the hydrogen content and the cold hydrogen introduction amount in the slurry entering the reactor are properly adjusted in accordance with the density of materials in upper part, middle part and lower part in the reactor, so as to realize an inner circulation of unconverted biomass in the reactor and a balanced discharge of the catalyst, thus ensuring reaction sufficiency of the hydrolysis, cracking, hydrogenation and the like, so that the conversion rate of the biomass and the yield of the fuel oil and the chemical raw materials can be improved.

4. In the biomass liquefaction process, the high pressure hydrogen is introduced into the slurry in two steps, i.e. separately introducing high pressure hydrogen before and after the slurry is heated. The introducing of high pressure hydrogen before the slurry is heated can increase the disturbance of slurry in the heat exchanger, so as to avoid the deposition of the solid biomass and the catalyst.

5. In the biomass liquefaction process, a second hydrogenation reaction is performed by adding a second catalyst and introducing hydrogen into the first stage hydrogenation product and controlling a reaction pressure of 13-25 MPa and a reaction temperature of 380-480° C. to obtain a second stage hydrogenation product; and the second stage hydrogenation product is subjected to separation operation to obtain a fuel oil and a chemical raw material. In the present biomass liquefaction process, the biomass is subjected to high-pressure high-temperature hydrolysis in the presence of a proper amount of water, and the hydrolysis products are subjected to primary cracking, hydrogenation and deep cracking and hydrogenation under the action of hydrogen, the first catalyst and the second catalyst, so as to realize the conversion of biomass to fuel oil and chemical raw materials and realize refining of the fuel oil and the chemical raw materials. In the process disclosed by the invention, the conversion rate of the biomass reaches up to 100%, the yield of the fuel oil and the chemical raw materials is about 75%, and the raw coke amount is less than 0.05%.

6. In the biomass liquefaction process, when the biomass raw material is a solid, it is necessary to pre-process the solid biomass, including drying, crushing and dedusting the solid biomass and then mixing the dried, crushed and dedusted solid biomass with the first catalyst in order to better utilize the surface energy of the biomass powder for attaching the first catalyst to the solid biomass powder surface, so that the first catalyst can timely provide hydrogen transfer for the hydrolysis products of biomass, so as to ensure that there is no coke condensation polymerization generated in the whole process, and a purpose of reducing coke amount is achieved. The first mixture is mixed with amorphous aluminium oxide loaded with VIB, VIIB or VIII metal oxides, and hydrogen is introduced to refine the fuel oil and the chemical raw materials. In this way, vulcanized noble metal obtains a good hydrogenation performance, so that generation of coke can be further avoided. In addition, the amorphous aluminium oxide has acidity, which contributes to more sufficient cracking.

7. The biomass liquefaction process uses two slurry bed reactors, and the reaction raw materials are fed into the slurry bed reactors in sequence for undergoing hydrogenation reaction, meanwhile, cold hydrogen is injected into these reactors. In this way, it can realize differential control of the flow velocity of each phase owing to different specific gravities of gas, liquid and solid materials in the reactor in combination with specific gravity difference change caused by the yield of light oil after the reaction, so that the biomass raw materials are subjected to hydrolysis, cracking and hydrogenation reaction from bottom to top in the reactor, and during the process, even if the biomass of high specific gravity and the catalyst solid particles rise along with the gas and light oil, they would be returned to the bottom to participate in the reaction again under the action of the cold hydrogen at upper part. Therefore, the hydrogen content and the cold hydrogen introduction amount in the slurry entering the reactor are properly adjusted in accordance with the density of materials in upper part, middle part and lower part in the reactor, so as to realize an inner circulation of unconverted biomass in the reactor and a balanced discharge of the catalyst, thus ensuring reaction sufficiency of the hydrolysis, cracking, hydrogenation and the like, so that the conversion rate of the biomass and the yield of the fuel oil and the chemical raw materials are improved.

8. In the biomass liquefaction process, the high pressure hydrogen is introduced into the slurry in three times, i.e. separately introducing high pressure hydrogen before and after the slurry is heated, and then introducing high pressure hydrogen again before feeding the mixture of the second catalyst and the first stage hydrogenation product into the second slurry bed reactor. The first introducing of high pressure hydrogen can increase the disturbance of slurry in the heat exchanger so as to avoid the deposition of the solid biomass and the catalyst. The high-pressure hydrogen is introduced for three times, so that the gas speed can meet the various speed requirements of various liquids, solids and catalysts, and the difference of rising or staying in the reactor is realized owing to the phase state and density difference of the mixture. Meanwhile, according to the density difference between the layers in the reactor, the air amount can be replenished and adjusted through the hydrogen introduction inlets formed on the outer wall of the reactor, thereby ensure sufficient reactions of hydrolysis, cracking and hydrogenation.

DETAILED DESCRIPTION OF EMBODIMENTS

A clear and complete description of the technical solutions in the present invention will be given below. Apparently, the embodiments described below are a part, but not all, of the embodiments of the present invention. All of other embodiments, obtained by those of ordinary skill in the art based on the embodiments of the present invention without any creative effort, fall into the protection scope of the present invention. In addition, in the different embodiments of the application described below, the technical features can be combined with each other as long as no conflict exists between each other.

Embodiment 1

Provided is a biomass liquefaction process, comprising the following steps:

preparing a slurry by adding sulfidation treated amorphous iron oxide hydroxide into animal oil in a reactor, and performing a first hydrogenation reaction by introducing hydrogen to the slurry and controlling a reaction pressure of 13 MPa and a reaction temperature of 480° C. to finally obtain a fuel oil and a chemical raw material.

Embodiment 2

Provided is a biomass liquefaction process, comprising the following steps:

mixing a dried, crushed and dedusted crop stalk with a sulfidation treated biomass charcoal loaded with iron oxide to form a mixture, adding the mixture into vegetable oil to prepare a slurry, and performing a first hydrogenation reaction by introducing hydrogen to the slurry and controlling a reaction pressure of 15 MPa and a reaction temperature of 440° C. to finally obtain a fuel oil and a chemical raw material.

In this embodiment, the biomass charcoal loaded with iron oxide is prepared by a method comprising:

(1) selecting a dry distillation biomass charcoal as a biomass charcoal carrier;

(2) loading a sulfidation treated iron oxide on the biomass charcoal carrier to prepare the catalyst.

Loading the sulfidation treated iron oxide on the biomass charcoal carrier comprises:

preparing a suspension by mixing the biomass charcoal carrier with an aqueous solution of the sulfidation treated iron oxide, then adding a precipitant into the suspension to precipitate the sulfidation treated iron oxide on the biomass charcoal carrier, followed by washing and drying to obtain the catalyst;

wherein, the precipitant is an solution comprising ammonia water and sodium carbonate solution, and during the precipitation process, the temperature is controlled to be 30° C., and the pH value is controlled to be 7; and the iron oxide accounts for 10 wt % of the total mass of the iron oxide and the biomass charcoal.

Embodiment 3

Provided is a biomass liquefaction process, which comprises the following steps:

mixing a dried, crushed and dedusted reed with a sulfidation treated biomass charcoal loaded with iron oxide hydroxide to form a mixture in a reactor, preparing a slurry by adding the mixture into coal tar, and performing a first hydrogenation reaction by introducing hydrogen to the slurry and controlling a reaction pressure of 17 MPa and a reaction temperature of 400° C. to finally obtain a fuel oil and a chemical raw material.

In the slurry, the biomass accounts for 50 wt %, the catalyst accounts for 0.1 wt %, and the catalyst has a particle diameter of 500 μm.

Embodiment 4

Provided is a biomass liquefaction process, which comprises the following steps:

mixing a dried, crushed and dedusted leaf with a sulfidation treated biomass charcoal loaded with iron hydroxide to form a mixture, preparing a slurry by adding the mixture into petroleum, and performing a first hydrogenation reaction by introducing hydrogen to the slurry and controlling a reaction pressure of 19 MPa and a reaction temperature of 370° C. to finally obtain a fuel oil and a chemical raw material.

In the slurry, the biomass accounts for 40 wt %, the catalyst accounts for 2 wt %, and the catalyst has a particle diameter of 400 μm. The dried solid biomass has a moisture content of 3 wt % and the crushed solid biomass has a particle size of 5000 μm.

Embodiment 5

Provided is a biomass liquefaction process, which comprises the following steps:

mixing a dried, crushed and dedusted algae with a sulfidation treated amorphous iron oxide hydroxide to form a mixture in a reactor, preparing a slurry by adding the mixture into the fuel oil and the chemical raw material prepared by the process of the present invention, and performing a first hydrogenation reaction by introducing hydrogen to the slurry and controlling a reaction pressure of 20 MPa and a reaction temperature of 340° C. to finally obtain a fuel oil and a chemical raw material.

Wherein, the catalyst is prepared by mixing sulphur with amorphous iron oxide hydroxide at a mass ratio of 0.4:1.

In the slurry, the biomass accounts for 30 wt %, the catalyst accounts for 4 wt %, and the catalyst has a particle diameter of 300 μm.

The dried solid biomass has a moisture content of 5 wt % and the crushed solid biomass has a particle size of 2000 μm.

Introducing hydrogen in the above process comprises:

introducing a high-pressure hydrogen into the slurry to prepare a reaction raw material mixture, wherein the high-pressure hydrogen and the slurry have a volume ratio of 600:1; and feeding the reaction raw material mixture into a first slurry bed reactor for undergoing hydrolysis, cracking and hydrogenation reactions, and simultaneous introducing a high-pressure cold hydrogen into the first slurry bed reactor by controlling the first slurry bed reactor to have a total gas velocity of 0.2 m/s, wherein each of the high-pressure hydrogen and the high-pressure cold hydrogen has a pressure of 13 MPa, and the high-pressure cold hydrogen has a temperature of 135° C.

Embodiment 6

Provided is a biomass liquefaction process, which comprises the following steps:

mixing dried, crushed and dedusted crop stalks and reeds with sulfidation treated amorphous iron oxide hydroxide to form a mixture in a first reactor, preparing a slurry by adding the mixture into vegetable oil and animal oil, and performing a first hydrogenation reaction by introducing hydrogen to the slurry and controlling a reaction pressure of 22 MPa, a reaction temperature of 300° C. and a reaction period of 15 min to finally obtain a fuel oil and a chemical raw material.

Wherein, the catalyst is prepared by mixing sulphur with the amorphous iron oxide hydroxide at a mass ratio of 0.8:1.

In the slurry, the biomass accounts for 20 wt %, the catalyst accounts for 6 wt %, and the catalyst has a particle diameter of 200 μm.

The dried solid biomass has a moisture content of 15 wt % and the crushed solid biomass has a particle size of 500 μm.

Said introducing hydrogen comprises:

firstly, introducing a high-pressure and medium-temperature hydrogen with a pressure of 18 MPa and a temperature of 350° C. into the slurry and heating the slurry up to 200° C. by heat transfer;

secondly, introducing a high-pressure and high-temperature hydrogen with a pressure of 18 MPa and a temperature of 510° C. into the slurry to prepare a reaction raw material mixture, wherein the total high-pressure hydrogen that are introduced at the first and second time and the slurry have a volume ratio of 700:1; and feeding the reaction raw material mixture into a slurry bed reactor for undergoing hydrolysis, cracking and hydrogenation reactions, and simultaneous introducing a high-pressure cold hydrogen having a pressure of 18 MPa and a temperature of 100° C. into the slurry bed reactor via 5 inlets formed on a side wall of the slurry bed reactor, and controlling the slurry bed reactor to have a total gas velocity of 0.08 m/s.

Embodiment 7

Provided is a biomass liquefaction process, which comprises the following steps:

mixing dried, crushed and dedusted woods and leaves with sulfidation treated amorphous iron oxide hydroxide to form a mixture in a reactor, adding the mixture into coal tar and petroleum to prepare a slurry, and performing a first hydrogenation reaction by introducing hydrogen to the slurry and controlling a reaction pressure of 23 MPa, a reaction temperature of 250° C. and a reaction time of 60 min to finally obtain a fuel oil and a chemical raw material.

Wherein, the catalyst is prepared by mixing sulphur with the amorphous iron oxide hydroxide at a mass ratio of 0.6:1.

In the prepared slurry, the biomass accounts for 15 wt %, the catalyst accounts for 8 wt %, and the catalyst has a particle diameter of 100 μm.

The dried solid biomass has a moisture content of 20 wt % and the crushed solid biomass has a particle size of 50 μm.

Said introducing hydrogen comprises:

firstly, introducing a high-pressure and medium-temperature hydrogen with a pressure of 23 MPa and a temperature of 260° C. into the slurry and heating the slurry up to 280° C. by heat transfer;

secondly, introducing a high-pressure and high-temperature hydrogen with a pressure of 23 MPa and a temperature of 430° C. into the slurry to prepare a reaction raw material mixture, wherein the total high-pressure hydrogen that are introduced at the first and second time and the slurry have a volume ratio of 800:1; and feeding the reaction raw material mixture into a slurry bed reactor for undergoing hydrolysis, cracking and hydrogenation reactions, and simultaneous introducing a high-pressure cold hydrogen having a pressure of 23 MPa and a temperature of 80° C. into the slurry bed reactor via four inlets formed on a side wall of the slurry bed reactor by controlling the slurry bed reactor to have a total gas velocity of 0.05 m/s, wherein, the catalyst stored in the slurry bed reactor is controlled in an amount of 30 wt % of the mass of liquid phase in the slurry bed reactor.

Embodiment 8

Provided is a biomass liquefaction process, which comprises the following steps:

mixing dried, crushed and dedusted reeds and algaes with sulfidation treated amorphous iron oxide hydroxide to form a mixture in a reactor, adding the mixture into vegetable oil and a fuel oil and chemical raw material prepared by the present invention to prepare a slurry, and performing a first hydrogenation reaction by introducing hydrogen to the slurry and controlling a reaction pressure of 25 MPa, a reaction temperature of 200° C. and a reaction time of 90 min to finally obtain a fuel oil and a chemical raw material;

wherein, the catalyst is prepared by mixing sulphur with the amorphous iron oxide hydroxide at a mass ratio of 1:1.

In the slurry, the biomass accounts for 10 wt %, the catalyst accounts for 10 wt %, and the catalyst has a particle diameter of 5 μm.

The dried solid biomass has a moisture content of 25 wt % and the crushed solid biomass has a particle size of 1 μm.

Said introducing hydrogen comprises:

firstly, introducing a high-pressure and medium-temperature hydrogen with a pressure of 27 MPa and a temperature of 180° C. into the slurry and heating the slurry up to 350° C. by heat transfer;

secondly, introducing a high-pressure and high-temperature hydrogen with a pressure of 27 MPa and a temperature of 360° C. into the slurry to prepare a reaction raw material mixture, wherein the total high-pressure hydrogen that are introduced at the first and second time and the slurry have a volume ratio of 1000:1; and feeding the reaction raw material mixture into a slurry bed reactor for undergoing hydrolysis, cracking and hydrogenation reactions, and simultaneous introducing a high-pressure cold hydrogen having a pressure of 27 MPa and a temperature of 50° C. into the slurry bed reactor via three inlets formed on a side wall of the slurry bed reactor by controlling the slurry bed reactor to have a total gas velocity of 0.02 m/s.

The catalyst stored in the slurry bed reactor is controlled in an amount of 5 wt % of the mass of liquid phase in the slurry bed reactor.

Embodiment 9

Provided is a biomass liquefaction process, which comprises the following steps:

(1) preparing a slurry by adding sulfidation treated amorphous iron oxide hydroxide into animal oil in a reactor, and introducing hydrogen into the slurry to perform a first hydrogenation reaction to obtain a first stage hydrogenation product; and (2) adding sulfidation treated amorphous aluminium oxide loaded with oxides of Mo and Ni into the first stage hydrogenation product and introducing hydrogen to perform a second hydrogenation reaction to obtain a second stage hydrogenation product which is then subjected to separation operation to finally obtain a fuel oil and chemical raw material;

wherein the first hydrogenation reaction is carried out at a pressure of 13 MPa and a temperature of 350° C., and the second hydrogenation reaction is carried out at a pressure of 13 MPa and a temperature of 480° C.

Embodiment 10

Provided is a biomass liquefaction process, which comprises the following steps:

(1) mixing dried, crushed and dedusted crop stalks of wheat and corn with a sulfidation treated biomass charcoal loaded with iron oxide to form a mixture, and adding the mixture into vegetable oil to prepare a slurry, and introducing hydrogen into the slurry to perform a first hydrogenation reaction to obtain a first stage hydrogenation product; and (2) adding a sulfidation treated biomass charcoal loaded with W oxide and Ni oxide into the first stage hydrogenation product, and introducing hydrogen to perform a second hydrogenation reaction to obtain a second stage hydrogenation product which is then subjected to separation operation to finally obtain a fuel oil and chemical raw material;

wherein, the first hydrogenation reaction is carried out at a pressure of 15 MPa and a temperature of 330° C., and the second hydrogenation reaction is carried out at a pressure of 15 MPa and a temperature of 470° C.

In this embodiment, the sulfidation treated biomass charcoal loaded with iron oxide is prepared by a method comprising:

(1) selecting a dry distillation biomass charcoal as a first biomass charcoal carrier;

(2) loading sulfidation treated iron oxide on the first biomass charcoal carrier to prepare the first catalyst.

Particularly, the step (2) comprises:

mixing the first biomass charcoal carrier with an aqueous solution of the sulfidation treated iron oxide to prepare a suspension, then adding a precipitant into the suspension to precipitate the sulfidation treated iron oxide onto the first biomass charcoal carrier, followed by washing and drying to finally prepare the first catalyst;

wherein, the precipitant is a solution of ammonia water and sodium carbonate, and during the precipitation process, the temperature is controlled to be 30° C., and the pH value is controlled to be 7.

The iron oxide accounts for 10 wt % of the total mass of the iron oxide and the biomass charcoal.

The sulfidation treated biomass charcoal loaded with W oxide and Ni oxide is prepared by a method comprising:

S1. subjecting a dry distillation biomass charcoal to acidification treatment to prepare a second biomass charcoal carrier, wherein the acidification treatment adopts a acidic medium which has a $H^+$ concentration of 0.5 mol/L, a volume ratio of the dry distillation biomass charcoal to the acid medium is 1:5, and the acidification treatment is carried out at a temperature of 30° C. for a period of 1 h; and S2. subjecting W oxide and Ni oxide and the second biomass charcoal carrier to ball milling to prepare a second catalyst with particle size of 500 μm.

Wherein, the W oxide and Ni oxide account for 1 wt % of the total mass of W oxide and Ni oxide and the biomass charcoal.

Embodiment 11

Provided is a biomass liquefaction process, which comprises the following steps:

(1) mixing a dried, crushed and dedusted reed with sulfidation treated biomass charcoal loaded with iron oxide hydroxide to form a mixture, and adding the mixture into coal tar to prepare a slurry, and introducing hydrogen into the slurry to perform a first hydrogenation reaction to obtain a first stage hydrogenation product; and (2) adding a sulfidation treated biomass charcoal loaded with Pd oxide and Ni oxide into the first stage hydrogenation product and introducing hydrogen to perform a second hydrogenation reaction to obtain a second stage hydrogenation product which is then subjected to separation operation to finally obtain a fuel oil and chemical raw material.

Wherein, the first hydrogenation reaction is carried out at a pressure of 17 MPa and a temperature of 310° C., and the second hydrogenation reaction is carried out at a pressure of 17 MPa and a temperature of 460° C.

In the slurry, the biomass accounts for 50 wt %, the first catalyst accounts for 0.1 wt %, and the first catalyst has a particle diameter of 500 μm. The second catalyst is added in an amount of 0.5 wt % of the first stage hydrogenation product, and the second catalyst has a particle size of 500 μm; in prior to adding the second catalyst into the first stage hydrogenation product, the second catalyst is prepared into an oil-catalyst slurry by mixing the second catalyst with an animal oil in a mass ratio of 1:10.

Embodiment 12

Provided is a biomass liquefaction process, which comprises the following steps:

(1) mixing dried, crushed and dedusted leaves, melons, fruits and vegetables with a sulfidation treated biomass charcoal loaded with iron hydroxide to form a mixture, and adding the mixture into petroleum to prepare a slurry, and introducing hydrogen into the slurry to perform a first hydrogenation reaction to obtain a first stage hydrogenation product; and (2) adding a sulfidation treated biomass charcoal loaded with Mo oxide and Co oxide into the first stage hydrogenation product and introducing hydrogen to perform a second hydrogenation reaction to obtain a second stage hydrogenation product which is then subjected to separation operation to finally obtain a fuel oil and chemical raw material.

Wherein, the first hydrogenation reaction is carried out at a pressure of 18 MPa and a temperature of 300° C., and the second hydrogenation reaction is carried out at a pressure of 18 MPa and a temperature of 440° C.

In the slurry, the biomass accounts for 40 wt %, the first catalyst accounts for 2 wt %, and the first catalyst has a particle diameter of 400 μm. The second catalyst is added in an amount of 0.8 wt % of the first stage hydrogenation product, and the second catalyst has a particle size of 400 μm; in prior to adding the second catalyst into the first stage hydrogenation product, the second catalyst is prepared into an oil-catalyst slurry by mixing the second catalyst with a vegetable oil in a mass ratio of 2:10. The dried solid biomass has a moisture content of 3 wt % and the crushed solid biomass has a particle size of 5000 μm.

Embodiment 13

Provided is a biomass liquefaction process, which comprises the following steps:

(1) mixing a dried, crushed and dedusted algae with a sulfidation treated amorphous iron oxide hydroxide to form a mixture in a reactor, and adding the mixture into a fuel oil and chemical raw material prepared by the present invention to prepare a slurry, and introducing hydrogen into the slurry to perform a first hydrogenation reaction to obtain a first stage hydrogenation product;

(2) adding a sulfidation treated amorphous aluminum oxide loaded with W oxide and Co oxide into the first stage hydrogenation product and introducing hydrogen to perform a second hydrogenation reaction to obtain a second stage hydrogenation product which is then subjected to separation treatment to finally obtain a fuel oil and chemical raw material.

Wherein, the first hydrogenation reaction is carried out at a pressure of 20 MPa and a temperature of 280° C., and the second hydrogenation reaction is carried out at a pressure of 20 MPa and a temperature of 420° C., The first catalyst is prepared by mixing sulphur and the amorphous iron oxide hydroxide at a mass ratio of 0.4:1.

In the slurry, the biomass accounts for 30 wt %, the first catalyst accounts for 4 wt % and has a particle diameter of 300 μm. The second catalyst is added in an amount of 1.2 wt % of the first stage hydrogenation product, and has a particle size of 300 µm; in prior to adding the second catalyst into the first stage hydrogenation product, the second catalyst is prepared into an oil-catalyst slurry by mixing the second catalyst with the fuel oil and chemical raw material prepared by this process at a mass ratio of 1:10. The dried solid biomass has a moisture content of 5 wt % and the crushed solid biomass has a particle size of 2000 µm.

Said introducing hydrogen in the above step (1) comprises: introducing a high-pressure hydrogen with a pressure of 13 MPa into the slurry by controlling the high-pressure hydrogen and the slurry at a volume ratio of 600:1 to prepare a first reaction raw material mixture; and feeding the first reaction raw material mixture into a first slurry bed reactor for undergoing a first hydrogenation reaction, and simultaneous introducing a high-pressure cold hydrogen having a pressure of 13 MPa and a temperature of 135° C. into the first slurry bed reactor by controlling the first slurry bed reactor to have a total gas velocity of 0.2 m/s.

Said introducing hydrogen in the above step (2) comprises: heating the mixture of the first stage hydrogenation product and the second catalyst to 380° C., and then feeding the mixture into a second slurry bed reactor and introducing high-pressure high-temperature hydrogen with a pressure of 13 MPa and a temperature of 480° C. to perform a second hydrogenation reaction, and meanwhile introducing a high-pressure cold hydrogen with a pressure of 13 MPa and a temperature of 135° C. into the second slurry bed reactor with controlling a total gas velocity of 0.1 m/s and a volume ratio of the hydrogen to the first stage hydrogenation product being 1000:1 in the second slurry bed reactor.

Embodiment 14

Provided is a biomass liquefaction process, which comprises the following steps:

(1) mixing dried, crushed and dedusted tabasheer grass and industrial wood with a sulfidation treated amorphous iron oxide hydroxide to form a mixture in a reactor, and adding the mixture into vegetable oil and animal oil to prepare a slurry, and introducing hydrogen into the slurry to perform a first hydrogenation reaction to obtain a first stage hydrogenation product;

(2) adding a sulfidation treated amorphous aluminium oxide loaded with Mo oxide and Ni oxide into the first stage hydrogenation product, and introducing hydrogen to perform a second hydrogenation reaction to prepare a second stage hydrogenation product which is then subjected to separation treatment to finally obtain a fuel oil and chemical raw material.

Wherein, the first hydrogenation reaction is carried out at a pressure of 22 MPa and a temperature of 260° C. for a period of 15 min, and the second hydrogenation reaction is carried out at a pressure of 22 MPa and a temperature of 400° C. for a period of 60 min.

The first catalyst is prepared by mixing sulphur and the amorphous iron oxide hydroxide at a mass ratio of 0.8:1.

In the slurry, the biomass accounts for 20 wt %, the first catalyst accounts for 6 wt %, and the first catalyst has a particle diameter of 200 µm. The second catalyst is added in an amount of 1.5 wt % of the first stage hydrogenation product, and the second catalyst has a particle size of 200 µm; in prior to adding the second catalyst into the first stage hydrogenation product, the second catalyst is prepared into an oil-catalyst slurry by mixing the second catalyst with solvent oil at a mass ratio of 2:10. The dried solid biomass has a moisture content of 15 wt % and the crushed solid biomass has a particle size of 500 µm.

Said introducing hydrogen in the above step (1) comprises: introducing a high-temperature and high-pressure hydrogen with a pressure of 18 MPa and a temperature of 350° C. into the slurry for a first time and heating the slurry to 200° C. by heat transfer, and then introducing a high-pressure and high-temperature hydrogen with a pressure of 18 MPa and a temperature of 510° C. into the slurry for a second time to prepare a first reaction raw material mixture, wherein the total high-pressure hydrogen that are introduced for the first and second time and the slurry have a volume ratio of 700:1; and feeding the first reaction raw material mixture into a first slurry bed reactor for undergoing a first hydrogenation reaction, and simultaneous introducing a high-pressure cold hydrogen with a pressure of 18 MPa and a temperature of 100° C. into the first slurry bed reactor via 5 inlets formed on a side wall of the first slurry bed reactor by controlling the first slurry bed reactor to have a total gas velocity of 0.08 m/s.

Said introducing hydrogen in the above step (2) comprises: heating a mixture of the first stage hydrogenation product and the second catalyst to 400° C., and then feeding the mixture and introducing a high-temperature high-pressure hydrogen with a pressure of 18 MPa and a temperature of 460° C. into a second slurry bed reactor to perform a second hydrogenation reaction, meanwhile introducing a high-pressure cold hydrogen with a pressure of 18 MPa and a temperature of 100° C. into the second slurry bed reactor via 5 inlets formed on a side wall of the second slurry bed reactor with controlling a total gas velocity of 0.08 m/s and a volume ratio of the hydrogen to the first stage hydrogenation product being 1200:1 in the second slurry bed reactor.

Embodiment 15

Provided is a biomass liquefaction process, which comprises the following steps:

(1) mixing dried, crushed and dedusted cotton straw, trees and waste paper with sulfidation treated amorphous iron oxide hydroxide to form a mixture in a reactor, and adding the mixture into coal tar and petroleum to prepare a slurry, and introducing hydrogen into the slurry to perform a first hydrogenation reaction to obtain a first stage hydrogenation product; and (2) adding a sulfidation treated amorphous aluminium oxide loaded with W oxide and Ni oxide into the first stage hydrogenation product and introducing hydrogen to perform a second hydrogenation reaction to prepare a second stage hydrogenation product which is then subjected to separation treatment to finally obtain a fuel oil and chemical raw material.

The biomass liquefaction process further comprises hydroforming the second stage hydrogenation product under a pressure of 7 MPa and a temperature of 460° C.

Wherein, the first hydrogenation reaction is carried out at a pressure of 23 MPa and a temperature of 230° C. for a period of 40 min, and the second hydrogenation reaction is carried out at a pressure of 23 MPa and a temperature of 390° C. for a period of 35 min.

The first catalyst is prepared by mixing sulphur with the amorphous iron oxide hydroxide at a mass ratio of 0.6:1.

In the slurry, the biomass accounts for 15 wt %, the first catalyst accounts for 8 wt %, and the first catalyst has a particle diameter of 100 µm. The second catalyst is added in an amount of 1.8 wt % of the first stage hydrogenation product, and the second catalyst has a particle size of 100 µm; in prior to adding the second catalyst into the first stage hydrogenation product, the second catalyst is prepared into an oil-catalyst slurry by mixing the second catalyst with a solvent oil at a mass ratio of 1:10. The solvent oil comprises animal oil and a fuel oil and chemical raw material prepared by the present invention. The dried solid biomass has a moisture content of 20 wt % and the crushed solid biomass has a particle size of 20 μm.

Said introducing hydrogen in the above step (1) comprises: introducing a high-temperature and high-pressure hydrogen with a pressure of 23 MPa and a temperature of 260° C. into the slurry for a first time and heating the slurry to 280° C. by heat transfer, and then introducing a high-pressure and high-temperature hydrogen with a pressure of 23 MPa and a temperature of 430° C. into the slurry for a second time to prepare a first reaction raw material mixture, wherein the total high-pressure hydrogen introduced for the first and second time and the slurry have a volume ratio of 800:1; and feeding the first reaction raw material mixture into a first slurry bed reactor for undergoing a first hydrogenation reaction, and simultaneous introducing a high-pressure cold hydrogen with a pressure of 23 MPa and a temperature of 80° C. into the first slurry bed reactor via 4 inlets formed on a side wall of the first slurry bed reactor by controlling the first slurry bed reactor to have a total gas velocity of 0.05 m/s.

Said introducing hydrogen in the above step (2) comprises: heating the mixture of the first stage hydrogenation product and the second catalyst to 440° C., and then feeding the mixture and introducing a high-temperature high-pressure hydrogen with a pressure of 23 MPa and a temperature of 440° C. into a second slurry bed reactor to perform a second hydrogenation reaction, meanwhile introducing high-pressure cold hydrogen with a pressure of 23 MPa and a temperature of 80° C. into the second slurry bed reactor via 4 inlets formed on a side wall of the second slurry bed reactor with controlling a total gas velocity of 0.07 m/s and a volume ratio of the hydrogen to the first stage hydrogenation product being 1350:1 in the second slurry bed reactor. Wherein, the first catalyst stored in the first slurry bed reactor is controlled in an amount of 5 wt % of the mass of liquid phase in the first slurry bed reactor. The second catalyst stored in the second slurry bed reactor is controlled in an amount of 30 wt % of the mass of liquid phase in the second slurry bed reactor.

Embodiment 16

Provided is a biomass liquefaction process, which comprises the following steps:

(1) mixing dried, crushed and deducted rice straw and reeds with sulfidation treated amorphous iron oxide hydroxide to form a mixture in a reactor, and adding the mixture into vegetable oil and a fuel oil and chemical raw material prepared by this process to prepare a slurry, and introducing hydrogen into the slurry to perform a first hydrogenation reaction to obtain a first stage hydrogenation product; and (2) adding sulfidation treated amorphous aluminium oxide loaded with Pd oxide and Co oxide into the first stage hydrogenation product and introducing hydrogen to perform a second hydrogenation reaction to prepare a second stage hydrogenation product which is then subjected to separation treatment to finally obtain a fuel oil and chemical raw material; and the biomass liquefaction process further comprises hydroforming the second stage hydrogenation product under a pressure of 23 MPa and a temperature of 250° C.

Wherein, the first hydrogenation reaction is carried out at a pressure of 25 MPa and a temperature of 200° C. for a period of 60 min, and the second hydrogenation reaction is carried out at a pressure of 25 MPa and a temperature of 380° C. for a period of 30 min. The first catalyst is prepared by mixing sulphur and the amorphous iron oxide hydroxide at a mass ratio of 1:1. In the slurry, the biomass accounts for 10 wt %, the first catalyst accounts for 10 wt %, and the first catalyst has a particle diameter of 5 μm. The second catalyst is added in an amount of 2 wt % of the first stage hydrogenation product, and the second catalyst has a particle size of 5 μm; in prior to adding the second catalyst into the first stage hydrogenation product, the second catalyst is prepared into an oil-catalyst slurry by mixing the second catalyst with a solvent oil at a mass ratio of 2:10. The solvent oil comprises vegetable oil and a fuel oil and chemical raw material prepared by this process. The dried solid biomass has a moisture content of 25 wt % and the crushed solid biomass has a particle size of 1 μm.

Said introducing hydrogen in the above step (1) comprises: introducing a high-pressure medium-temperature hydrogen with a pressure of 27 MPa and a temperature of 180° C. into the slurry for a first time and heating the slurry to 350° C. by heat transfer, and then introducing a high-pressure high-temperature hydrogen with a pressure of 27 MPa and a temperature of 360° C. into the slurry for a second time to prepare a first reaction raw material mixture, wherein the total high-pressure hydrogen introduced for the first and second time and the slurry have a volume ratio of 1000:1; and feeding the first reaction raw material mixture into a first slurry bed reactor for undergoing a first hydrogenation reaction, and simultaneous introducing a high-pressure cold hydrogen with a pressure of 27 MPa and a temperature of 50° C. into the first slurry bed reactor via 3 inlets formed on a side wall of the first slurry bed reactor by controlling the first slurry bed reactor to have a total gas velocity of 0.02 m/s.

Said introducing hydrogen in the above step (2) comprises: heating a mixture of the first stage hydrogenation product and the second catalyst to 480° C., and then feeding the mixture and introducing a high-pressure high-temperature hydrogen with a pressure of 27 MPa and a temperature of 430° C. into a second slurry bed reactor to perform a second hydrogenation reaction, meanwhile introducing a high-pressure cold hydrogen with a pressure of 27 MPa and a temperature of 50° C. into the second slurry bed reactor via 3 inlets formed on a side wall of the second slurry bed reactor with controlling a total gas velocity of 0.06 m/s and a volume ratio of the hydrogen to the first stage hydrogenation product being 1500:1 in the second slurry bed reactor. Wherein, the first catalyst stored in the first slurry bed reactor is controlled in an amount of 30 wt % of the mass of liquid phase in the first slurry bed reactor. The second catalyst stored in the second slurry bed reactor is controlled in an amount of 5 wt % of the mass of liquid phase in the second slurry bed reactor.

Embodiment 17

In this embodiment, a first catalyst and a second catalyst are prepared as follows:

Preparation of the first catalyst comprises:

(1) selecting a dry distillation biomass charcoal as a first biomass charcoal carrier; and (2) loading a first active component on the first biomass charcoal carrier to prepare a first catalyst, wherein the first active component is iron oxide, and counted by the mass of metal element, the first active component accounts for 50% of the first biomass charcoal carrier by mass.

Particularly, in step (2), loading the first active component on the first biomass charcoal carrier comprises:

mixing the first biomass charcoal carrier with an aqueous solution of the first active component to prepare a suspension, then adding a precipitant into the suspension to precipitate the first active component on the first biomass charcoal carrier, followed by washing and drying to obtain the first catalyst; wherein the precipitant is ammonia water or an aqueous solution of at least one selected from alkali metal carbonate, alkali metal bicarbonate, alkali metal hydroxide and any combination thereof, and during the precipitation process, the temperature is controlled to be 90° C., and the pH value is controlled to be 9.

Preparation of the second catalyst comprises:

S1. subjecting a dry distillation biomass charcoal to acidification treatment or alkalization treatment to prepare a second biomass charcoal carrier, wherein the acidification treatment adopts an acidic medium which has a $H^+$ concentration of 5 mol/L, a volume ratio of the dry distillation biomass charcoal to the acid medium is 1:15, and the acidification treatment is carried out at a temperature of 80° C. for a period of 10 h; the alkalization treatment adopts an alkaline medium which has an $OH^-$ concentration of 0.5 mol/L, a volume ratio of the dry distillation biomass charcoal to the alkaline medium is 1:5, and the alkalization treatment is carried out at a temperature of 30° C. for a period of 10 h; and S2. subjecting the second active component and the second biomass charcoal carrier to vibration grinding and/or plane grinding and/or ball milling to prepare a second catalyst with particle size of 200-300 μm.

Wherein the second active component is an oxide loaded with Mo and W, and counted by the mass of metal element, the second active component accounts for 5% of the second biomass charcoal carrier by mass.

Embodiment 18

Provided is a biomass liquefaction process, which comprises the following steps:

using a biomass charcoal loaded with iron oxide hydroxide as a first catalyst, and using a biomass charcoal loaded with molybdenum oxide as a second catalyst;

(1) preparing a slurry comprising the first catalyst, a vulcanizing agent and animal, and introducing hydrogen to the slurry to undergo a first hydrogenation reaction by controlling a reaction pressure of 25 MPa and a reaction temperature of 200° C. to obtain a first stage hydrogenation product;

(2) preparing an oil-catalyst slurry by mixing the second catalyst, a vulcanizing agent and animal oil, and adding the oil-catalyst slurry into the first stage hydrogenation product and introducing hydrogen to perform a second hydrogenation reaction by controlling a reaction pressure of 25 MPa and a reaction temperature of 380° C. to obtain a second stage hydrogenation product; and (3) subjecting the second stage hydrogenation product to separation treatment to obtain a fuel oil and chemical raw material.

Embodiment 19

Provided is a biomass liquefaction process, which comprises the following steps:

using an amorphous iron oxide as a first catalyst, and using an amorphous aluminium oxide loaded with W oxide and Ni oxide as a second catalyst;

(1) drying corn stalks in a dryer until its moisture content is 5 wt %, and then crushing the corn stalks in a pulverizer until its particle size is 1-50 μm, and dedusting the corn stalks to obtain stalk particles, and mixing the stalk particles and the first catalyst with petroleum to prepare a slurry;

(2) introducing a high-pressure medium-temperature hydrogen with a pressure of 13 MPa and a temperature of 180° C. into the slurry for a first time and heating the slurry to 200° C. by heat transfer, and then introducing a high-pressure and high-temperature hydrogen with a pressure of 13 MPa and a temperature of 510° C. into the slurry for a second time to prepare a first reaction raw material mixture, wherein the total high-pressure hydrogen introduced at the first and second time and the slurry have a mass ratio of 600:1;

feeding the first reaction raw material mixture and introducing hydrogen into a first slurry bed reactor to perform a first hydrogenation reaction with controlling a reaction pressure of 13 MPa and a reaction temperature of 350° C. to obtain a first stage hydrogenation product;

wherein the above introducing hydrogen comprises: introducing a high-pressure cold hydrogen having a pressure of 27 MPa and a temperature of 50° C. into the first slurry bed reactor after the first reaction raw material mixture is fed into the first slurry bed reactor, by controlling the first slurry bed reactor to have a total gas velocity of 0.05 m/s;

(3) mixing the second catalyst, a vulcanizing agent and animal oil to prepare an oil-catalyst slurry, and adding the oil-catalyst slurry into the first stage hydrogenation product and introducing hydrogen to perform a second hydrogenation reaction with controlling a reaction pressure of 13 MPa and a reaction temperature of 480° C. to obtain a second stage hydrogenation product; and (4) subjecting the second stage hydrogenation product to separation treatment to obtain a fuel oil and chemical raw material.

Embodiment 20

Provided is a biomass liquefaction process, which comprises the following steps:

using a biomass charcoal loaded with iron oxide hydroxide as a first catalyst, and using a biomass charcoal loaded with nickel oxide as a second catalyst;

(1) drying sea algae and sea grass in a dryer until the moisture content is 15 wt %, and then crushing the sea algae and sea grass in a pulverizer until the particle size is 400-500 μm, and dedusting the sea algae and sea grass to obtain particles of sea algae and sea grass, and mixing the particles of sea algae and sea grass and the first catalyst with coal tar to prepare a slurry, wherein a mass ratio of a vulcanizing agent to the first catalyst is 0.4:1, the first catalyst accounts for 10% of the slurry by mass, the first catalyst has a particle size of 5-100 μm, the particles of sea algae and sea grass account for 10% of the slurry by mass;

(2) introducing a high-pressure medium-temperature hydrogen with a pressure of 27 MPa and a temperature of 350° C. into the slurry for a first time and heating the slurry to 350° C. by heat transfer, and then introducing a high-pressure high-temperature hydrogen having a pressure of 27 MPa and a temperature of 360° C. into the slurry for a second time to prepare a first reaction raw material mixture, wherein a mass ratio of the total high-pressure hydrogen introduced at the first and second time to the slurry is 1000:1;

feeding the first reaction raw material mixture into a first slurry bed reactor and introducing hydrogen to perform a first hydrogenation reaction with controlling a reaction pressure of 20 MPa and a reaction temperature of 300° C. to obtain a first stage hydrogenation product;

wherein the above introducing hydrogen comprises: introducing a high-pressure cold hydrogen having a pressure of 13 MPa and a temperature of 135° C. into the first slurry bed reactor after the first reaction raw material mixture is fed into the first slurry bed reactor, and controlling the first slurry bed reactor to have a total gas velocity of 0.08 m/s;

(3) mixing the second catalyst with a vulcanizing agent and animal oil to prepare an oil-catalyst slurry, and adding the oil-catalyst slurry into the first stage hydrogenation product and introducing hydrogen to perform a second hydrogenation reaction with controlling a reaction pressure of 25 MPa and a reaction temperature of 430° C. to obtain a second stage hydrogenation product, wherein a mass ratio of the second catalyst to the solvent oil in the oil-catalyst slurry is 1:10, the second catalyst accounts for 0.5 wt % of the first stage hydrogenation product, a mass ratio of the vulcanizing agent to the second catalyst is 0.4:1, and the second catalyst has a particle size of 400-500 μm;

(4) subjecting the second stage hydrogenation product to separation treatment to obtain a fuel oil and chemical raw material respectively.

Embodiment 21

Provided is a biomass liquefaction process, which comprises the following steps:

using a biomass charcoal loaded with iron oxide as a first catalyst, and using a biomass charcoal loaded with nickel oxide and iron oxide as a second catalyst;

(1) drying straw in a dryer until the moisture content is 10 wt %, and then crushing the straw in a pulverizer until the particle size is 4000-5000 μm, and deducting the straw to obtain straw particles, and mixing the straw particles and the first catalyst with coal tar to prepare a slurry, wherein a mass ratio of a vulcanizing agent to the first catalyst is 1:1, the first catalyst accounts for 2% of the slurry by mass, the first catalyst has a particle size of 400-500 μm, the straw particles accounts for 30% of the slurry by mass;

(2) introducing a high-pressure medium temperature hydrogen with a pressure of 20 MPa and a temperature of 250° C. into the slurry for a first time and heating the slurry to 300° C. by heat transfer, and then introducing a high-pressure high-temperature hydrogen with a pressure of 20 MPa and a temperature of 450° C. into the slurry for a second time to prepare a first reaction raw material mixture, wherein the total introduced high-pressure hydrogen at two times and the slurry have a mass ratio of 800:1;

feeding the first reaction raw material mixture into a first slurry bed reactor and introducing hydrogen into the first slurry bed reactor to perform a first hydrogenation reaction with controlling a reaction pressure of 20 MPa and a reaction temperature of 300° C. for a period of 15-30 min to obtain a first stage hydrogenation product, wherein the above introducing hydrogen comprises: introduced a high-pressure cold hydrogen having a pressure of 17 MPa and a temperature of 100° C. into the first slurry bed reactor after the first reaction raw material mixture is fed into the first slurry bed reactor, and controlling the first slurry bed reactor to have a total gas velocity of 0.02 m/s;

(3) mixing the second catalyst with a vulcanizing agent and animal oil to prepare an oil-catalyst slurry, adding the oil-catalyst slurry into the first stage hydrogenation product to obtain a mixture, heating the mixture to 430° C. and feeding it into a second slurry bed reactor, and introducing hydrogen into the second slurry bed reactor to perform a second hydrogenation reaction with controlling a reaction pressure of 17 MPa and a reaction temperature of 450° C. for a period of 30-40 min to obtain a second stage hydrogenation product, wherein the second catalyst stored in the second slurry bed reactor is controlled in an amount of 5-20 wt % of the mass of liquid phase in the second slurry bed reactor;

a mass ratio of the second catalyst to a solvent oil in the oil-catalyst slurry is 2:10, the second catalyst accounts for 1 wt % of the first stage hydrogenation product, a mass ratio of the vulcanizing agent to the second catalyst is 1:1, and the second catalyst has a particle size of 100-200 μm;

wherein the introducing hydrogen comprises: introducing a high-temperature high-pressure hydrogen with a pressure of 13 MPa and a temperature of 480° C. into the second slurry bed reactor after the mixture is fed into the second slurry bed reactor, to perform a second hydrogenation reaction, and meanwhile introducing a high-pressure cold hydrogen with a pressure of 13 MPa and a temperature of 135° C. into the second slurry bed reactor, and controlling a total gas velocity of 0.1 m/s and a volume ratio of the hydrogen to the first stage hydrogenation product being 1000:1 in the second slurry bed reactor; and (4) hydroforming the second stage hydrogenation product under a pressure of 7 MPa and a temperature of 460° C., followed by separation to obtain a fuel oil and chemical raw material.

Embodiment 22

Provided is a biomass liquefaction process, which comprises the following steps:

preparing a first catalyst and a second catalyst according to the embodiment 17;

(1) drying straw in a dryer until the moisture content is 20 wt %, and then crushing the straw in a pulverizer until the particle size is 3000-4000 μm, and dedusting the straw to obtain straw particles, and mixing the straw particles and the first catalyst with coal tar to prepare a slurry, wherein a mass ratio of a vulcanizing agent to the first catalyst is 0.7:1, the first catalyst accounts for 10% of the slurry by mass, the first catalyst has a particle size of 5-200 μm, and the straw particles account for 40% of the slurry by mass;

(2) introducing a high-pressure medium-temperature hydrogen with a pressure of 18 MPa and a temperature of 300° C. into the slurry for a first time and heating the slurry to 250° C. by heat transfer, and then introducing a high-pressure high-temperature hydrogen with a pressure of 18 MPa and a temperature of 400° C. into the slurry for a second time to prepare a first reaction raw material mixture, wherein the hydrogen totally introduced at the first and second time and the slurry have a mass ratio of 900:1;

feeding the first reaction raw material mixture into a first slurry bed reactor and introducing hydrogen into the first slurry bed reactor to perform a first hydrogenation reaction with controlling a reaction pressure of 20 MPa and a reaction temperature of 300° C. for a period of 30-60 min to obtain a first stage hydrogenation product, wherein the first catalyst stored in the first slurry bed reactor is controlled in an amount of 20-30 wt % of the mass of liquid phase in the first slurry bed reactor;

wherein the above introducing hydrogen comprises: introducing a high-pressure cold hydrogen having a pressure of 17 MPa and a temperature of 100° C. into the first slurry bed reactor after the first reaction raw material mixture is fed into the first slurry bed reactor, and controlling the first slurry bed reactor to have a total gas velocity of 0.02 m/s;

(3) mixing the second catalyst with a vulcanizing agent and animal oil to prepare an oil-catalyst slurry, and adding the oil-catalyst slurry into the first stage hydrogenation product to obtain a mixture, and heating the mixture to 430° C. and feeding it into a second slurry bed reactor, and introducing hydrogen into the second slurry bed reactor to perform a second hydrogenation reaction with controlling a reaction pressure of 17 MPa and a reaction temperature of 450° C. for a period of 50-60 min to obtain a second stage hydrogenation product, wherein the second catalyst stored in the second slurry bed reactor is controlled in an amount of 20-30 wt % of the mass of liquid phase in the second slurry bed reactor;

a mass ratio of the second catalyst to a solvent oil in the oil-catalyst slurry is 2:10, the second catalyst accounts for 1 wt % of the first stage hydrogenation product, a mass ratio of the vulcanizing agent to the second catalyst is 0.01:1, and the second catalyst has a particle size of 100-200 μm;

wherein the introducing hydrogen comprises: feeding the mixture into the second slurry bed reactor, and introducing a high-temperature high-pressure hydrogen with a pressure of 13 MPa and a temperature of 480° C. into the second slurry bed reactor to perform a second hydrogenation reaction, and meanwhile introducing a high-pressure cold hydrogen with a pressure of 13 MPa and a temperature of 135° C. into the second slurry bed reactor via 3-5 inlets formed on a side wall of the second slurry bed reactor, with controlling a total gas velocity being 0.1 m/s and a volume ratio of the hydrogen to the first stage hydrogenation product being 1000:1 in the second slurry bed reactor; and (4) hydroforming the second stage hydrogenation product under a pressure of 23 MPa and a temperature of 250° C., followed by separation to obtain a fuel oil and chemical raw material.

Comparative Example 1

Provided is a biomass liquefaction process, which comprises the following steps:

adding sulfidation treated amorphous iron oxide hydroxide into animal oil to prepare a slurry in a reactor, and introducing hydrogen to the slurry to perform a hydrogenation reaction by controlling a reaction pressure of 4 MPa and a reaction temperature of 430° C. to finally obtain a fuel oil and chemical raw material.

Comparative Example 2

Provided is a biomass liquefaction process, which comprises the following steps:

adding a sulfidation treated oil-soluble dispersive hydrogenation catalyst into animal oil to prepare a slurry in a reactor, and performing hydrogenation reaction by introducing hydrogen to the slurry and controlling a reaction pressure of 13 MPa and a reaction temperature of 480° C. to finally obtain a fuel oil and chemical raw material.

Comparative Example 3

Provided is a method for preparing a fuel oil and chemical raw material from biomass. The method comprises the same steps as the method of embodiment 17, except that the first slurry bed reactor is controlled to have a reaction pressure of 10 Mpa and a reaction temperature of 400° C.

Comparative Example 4

Provided is a method for preparing a fuel oil and chemical raw material from biomass. The method comprises the same steps as the method of embodiment 17, except that the second slurry bed reactor is controlled to have a reaction pressure of 30 Mpa and a reaction temperature of 200° C.

Test Example

The products prepared by Embodiment 1 and Comparative examples 1 and 2 are tested to compare the product distribution, and the results are shown in the following table 1.

TABLE 1

Product distribution comparison of Embodiment 1 and Comparative examples 1-2

| Conversion result | Biomass conversion rate wt % | Light oil yield wt % | Coke amount wt % |
| --- | --- | --- | --- |
| Comparative example 1 | 87.62 | 69.59 | 2.18 |
| Comparative example 2 | 88.36 | 70.61 | 2.05 |
| Embodiment 1 | 98.94 | 75 | 0.01 |

Table 1 shows that, when compared with the Comparative examples 1-2, the biomass conversion rate and light oil yield obtained by the Embodiment 1 are higher while the coke amount is remarkably reduced and almost no coke is generated. Therefore the results have proved that the process of the present invention can remarkably increase the biomass conversion rate and light oil yield and reduce coke amount. In addition, the multi-stage liquefaction enables the hydrogenation reaction is more sufficient and the quality of the light oil is better.

The products prepared by Embodiment 9 and Comparative examples 1 and 2 are tested to compare the product distribution, and results are shown in the following table 2.

TABLE 2

Product distribution comparison of Embodiment 9 and Comparative examples 1-2

| Conversion result | Biomass conversion rate wt % | Light oil yield wt % | Coke amount wt % |
| --- | --- | --- | --- |
| Comparative example 1 | 87.62 | 69.59 | 2.18 |
| Comparative example 2 | 88.36 | 70.61 | 2.05 |
| Embodiment 9 | 98.94 | 75 | 0.01 |

Table 2 shows that, compared with the Comparative examples 1-2, the biomass conversion rate and light oil yield obtained by the Embodiment 9 are higher while the coke amount is remarkably reduced and almost no coke is generated. Therefore the results have proved that the process of the present invention can remarkably increase the biomass conversion rate and light oil yield and reduce coke amount. In addition, the multi-stage liquefaction enables the hydrogenation reaction is more sufficient and the quality of the light oil is better.

The products prepared by Embodiment 17 and Comparative examples 3 and 4 are tested to compare the product distribution, and the results are shown in the following table 3.

TABLE 3

Product distribution comparison of Embodiment 17 and Comparative examples 3-4

| Conversion result | Biomass conversion rate wt % | Fuel oil yield wt % | Coke amount wt % |
|---|---|---|---|
| Comparative example 3 | 85.62 | 69.59 | 2.18 |
| Comparative example 4 | 82.36 | 70.61 | 3.05 |
| Embodiment 17 | 99.24 | 79 | 0.01 |

Table 3 shows that, compared with the Comparative examples 3-4, the biomass conversion rate and fuel oil yield obtained by the Embodiment 17 are higher, while the coke amount is remarkably reduced and almost no coke is generated. Therefore the results have proved that the process of the present invention can remarkably increase the biomass conversion rate and fuel oil yield and reduce coke amount. In addition, the multi-stage liquefaction enables the hydrogenation reaction is more sufficient and the quality of the fuel oil is higher.

Apparently, the above-mentioned embodiments are only illustrated for distinct description, but not intended to limit embodiments. For those having ordinary skill in the art, changes or variations of other different forms can also be made on the basis of the above-mentioned description. Herein, all embodiments are not required to and cannot be exhaustive. Readily apparent changes or variations evolved therefrom still fall within the protection scope of the present invention.

The following is claimed:

1. A biomass liquefaction process, comprising the following steps of
    S1: preparing a slurry comprising a first catalyst and a biomass; and
    S2: performing a first hydrogenation reaction by introducing hydrogen to the slurry and controlling a reaction pressure of 13-25 MPa and a reaction temperature of 200° C. to 480° C. to obtain a first stage hydrogenation product that comprises a bio oil;
    wherein introducing hydrogen comprises introducing a high-pressure hydrogen into the slurry to prepare a reaction raw material mixture, wherein the high-pressure hydrogen and the slurry have a volume ratio of (600-1000):1; and
    feeding the reaction raw material mixture into a first slurry bed reactor for undergoing hydrolysis, cracking and hydrogenation reactions, and simultaneous introducing a high-pressure cold hydrogen into the first slurry bed reactor by controlling the first slurry bed reactor to have a total gas velocity of 0.02-0.2 m/s;
    wherein each of the high-pressure hydrogen and the high-pressure cold hydrogen has a pressure of 13-27 MPa, and the high-pressure cold hydrogen has a temperature of 50-135° C.

2. The biomass liquefaction process of claim 1, wherein the biomass accounts for 10-50 wt % of the slurry.

3. The biomass liquefaction process of claim 1, wherein the first catalyst accounts for 0.1-10 wt % of the slurry, and the first catalyst has a particle diameter of 5 μm-500 μm.

4. The biomass liquefaction process of claim 3, wherein the first catalyst accounts for 2 wt % of the shiny.

5. The biomass liquefaction process of claim 1, wherein the slurry is prepared by adding the first catalyst into a liquid biomass selected from a group consisting of vegetable oil, animal oil, gutter oil, animal feces and any mixture thereof; or
    mixing a dried, crushed and dedusted solid biomass with the first catalyst to form a mixture, and adding the mixture into an oil product selected from a group consisting of vegetable oil, animal oil, coal tar, petroleum, a bio-oil prepared by the present process, and any mixture thereof.

6. The biomass liquefaction process of claim 5, wherein the dried solid biomass has a moisture content of 3-25 wt %, and the crushed solid biomass has a particle size of 1-5000 μm.

7. The biomass liquefaction process of claim 6, wherein the dried solid biomass has a moisture content of 5-15 wt %.

8. The biomass liquefaction process of claim 6, wherein the crushed solid biomass has a particle size of 20-500 μm.

9. The biomass liquefaction process of claim 1, comprising controlling the first slurry bed reactor to have a total gas velocity of 0.05-0.08 m/s.

10. The biomass liquefaction process of claim 1, wherein introducing the high pressure hydrogen into the slurry comprises two steps of:
    firstly, introducing a high-pressure and medium-temperature hydrogen into the slurry and heating the slurry up to 200-350° C. by heat transfer, and
    secondly, introducing a high-pressure and high-temperature hydrogen into the slurry;
    wherein the high-pressure and medium-temperature hydrogen has a temperature of 180-350° C., and the high-pressure and high-temperature hydrogen has a temperature of 360-510° C.

11. The biomass liquefaction process of claim 1, wherein the cold hydrogen is introduced via 3-5 inlets formed on a side wall of the first slurry bed reactor.

12. The biomass liquefaction process of claim 1, wherein the first catalyst stored in the slurry bed reactor is controlled in an amount of 5-30 wt % of the mass of liquid phase in the first slurry bed reactor.

13. The biomass liquefaction process of claim 1, wherein the first hydrogenation reaction lasts for a period of 15-90 min.

14. The biomass liquefaction process of claim 1, wherein
    the first catalyst is a sulfidation treated biomass charcoal loaded with a first active component selected from a group consisting of iron oxide, iron oxide hydroxide, iron hydroxide, and any mixture thereof; or
    the first catalyst is a sulfidation treated amorphous iron oxide hydroxide.

15. The biomass liquefaction process of claim 1, wherein the biomass liquefaction process further comprises following steps:
    S3: performing a second hydrogenation reaction by adding a second catalyst and introducing hydrogen into the first stage hydrogenation product and controlling a reaction pressure of 13-25 MPa and a reaction temperature of 380-480° C. to obtain a second stage hydrogenation product that comprises a bio-oil; and
    S4: subjecting the second stage hydrogenation product to separation operation to obtain a fuel oil and chemical raw material.

16. The biomass liquefaction process of claim 15, wherein the second catalyst is added in an amount of 0.5-2 wt % of the first stage hydrogenation product, and the second catalyst has a particle size of 5-500 μm; and
    the second catalyst is prepared into an oil-catalyst slurry by mixing the second catalyst with a solvent oil in a mass ratio of (1-2):10 prior to adding the second catalyst into the first stage hydrogenation product, wherein the solvent oil is selected from a group consisting of vegetable oil, animal oil, a bio-oil prepared by the present process and any combination thereof.

17. The biomass liquefaction process of claim 15, wherein introducing hydrogen in step S3 is carried out by
heating a mixture of the second catalyst and the first stage hydrogenation product to 380-480° C., and
feeding the mixture into a second slurry bed reactor and introducing a high-temperature and high-pressure hydrogen for performing a second hydrogenation reaction, and simultaneous introducing a high-pressure cold hydrogen into the second slurry bed reactor, with controlling a total gas velocity at 0.06-0.1 m/s and a volume ratio of the hydrogen to the first stage hydrogenation product at (1000-1500):1 in the second slurry bed reactor;
wherein each of the high-temperature and high-pressure hydrogen and the high-pressure cold hydrogen has a pressure of 13-27 MPa, and the high-temperature and high-pressure hydrogen has a temperature of 430-480° C., and the high-pressure cold hydrogen has a temperature range of 50–135° C.

18. The biomass liquefaction process of claim 17, heating the mixture of the second catalyst and the first stage hydrogenation product to 430° C.

19. The biomass liquefaction process of claim 17, wherein the cold hydrogen is introduced via 3-5 inlets formed on a side wall of the second slurry bed reactor.

20. The biomass liquefaction process of claim 15, wherein the second catalyst stored in the second slurry bed reactor is controlled in an amount of 5-30 wt % of liquid phase in the second slurry bed reactor.

21. The biomass liquefaction process of claim 15, wherein the second hydrogenation reaction lasts for a period of 30-60 min.

22. The biomass liquefaction process of claim 15, characterized by further comprising hydroforming the second stage hydrogenation product under a pressure of 7-23 MPa and a temperature of 250-460° C.

23. The biomass liquefaction process of claim 15, wherein
the first catalyst is a sulfidation treated biomass charcoal loaded with a first active component selected from a group consisting of iron oxide, iron oxide hydroxide, iron hydroxide and any mixture thereof, and
the second catalyst is a sulfidation treated biomass charcoal loaded with a second active component selected from a group consisting of oxides of Mo, W, Fe, Co, Ni or Pd or any mixture thereof; or
the first catalyst is a sulfidation treated amorphous iron oxide hydroxide and the second catalyst is a sulfidation treated amorphous aluminium oxide loaded with a third active component selected from a group consisting of oxides of metals of group VIB, group VIIB and group VIII in the periodic table of elements and any mixture thereof.

24. The biomass liquefaction process of claim 23, wherein the sulfidation is carried out with a vulcanizing agent, and wherein the vulcanizing agent and the first catalyst have a mass ratio of (0.4-1):1, and the vulcanizing agent and the second catalyst have a mass ratio of (0.01-1):1.

25. The biomass liquefaction process of claim 1, wherein the biomass accounts for 30-40 wt % of the slurry.

* * * * *